United States Patent [19]

Englin et al.

[11] 4,262,109

[45] Apr. 14, 1981

[54] NEW EPOXY RESIN AND USE AS BUILD UP SUPPRESSANT COATING IN POLYMERIZATION REACTORS AND IN VINYL HALIDE POLYMERIZATION

[75] Inventors: Boris Englin, Victoria, Australia; Roger J. Chelson, St. Neots, England

[73] Assignees: Imperial Chemical Industries Limited, London, England; ICI Australia Limited, Melbourne, Australia

[21] Appl. No.: 68,478

[22] Filed: Aug. 20, 1979

[30] Foreign Application Priority Data

Aug. 29, 1978 [GB] United Kingdom .............. 34902/78

[51] Int. Cl.$^3$ ............................................. C08G 59/56
[52] U.S. Cl. .................................... 528/104; 528/120; 526/62
[58] Field of Search ....................... 528/104, 120, 407

[56] References Cited

U.S. PATENT DOCUMENTS

| | | | |
|---|---|---|---|
| 3,366,600 | 1/1968 | Haberlin et al. | 260/47 |
| 3,428,601 | 2/1969 | Dijkstra et al. | 260/47 |
| 3,519,576 | 7/1970 | Johnson et al. | 260/2 |
| 3,853,812 | 12/1974 | Helm | 260/47 EC |

OTHER PUBLICATIONS

Hackh's Chemical Dictionary, McGraw-Hill, 4th Ed., 1969, pp. 481–482.

*Primary Examiner*—Earl A. Nielsen
*Attorney, Agent, or Firm*—Cushman, Darby & Cushman

[57] ABSTRACT

An epoxy resin, useful for coating the internal surface(s) of a reactor such as one used for vinyl halide, particularly vinyl chloride, polymerisation in aqueous dispersion for the purpose of suppressing build-up, is made by cross-linking (I) the uncross-linked polyether intermediate of an epoxy resin, by admixture with (II) a product made from the reaction of (A) at least one aliphatic amine containing two or more primary aliphatic amino groups, (B) at least one aromatic amine containing two or more primary aromatic amino groups, and (C) at least one compound selected from oxo-group substituted aromatic compounds and quinone-type compounds, wherein the molar ratio (A):(B) is 4:1 to 1:3.

Preferably, (I) is made from the reaction between 2,2-bis-(4-hydroxyphenyl) propane and epichlorohydrin and (II) is made from the reaction of (A) tetraethylenepentamine, (B) p-phenylene diamine, and (C) hydropquinone and pyrogallol. The molar ratio of (A):(B) is preferably from 2:1 to 1:2 and the molar ratio [(A)+(B)]:(C) is preferably from 1:4 to 2:1. The weight ratio of (I):(II) is preferably from 1:4 to 2:1.

6 Claims, No Drawings

NEW EPOXY RESIN AND USE AS BUILD UP SUPPRESSANT COATING IN POLYMERIZATION REACTORS AND IN VINYL HALIDE POLYMERIZATION

The present invention relates to a new epoxy resin useful as a build-up suppressant coating for the internal surfaces of a reactor, and to a process for the polymerisation of vinyl halide monomers such as vinyl chloride in aqueous dispersion carried out in such a coated reactor.

When vinyl halide monomers, particularly vinyl chloride, are polymerised in aqueous dispersion in a reactor it is well known that a problem arises in that surfaces inside the reactor become coated with tenaciously adhering polymeric material known as build-up. By polymerisation in aqueous dispersion is meant polymerisation in aqueous emulsion or aqueous suspension (including aqueous microsuspension). The formation of tenaciously adhering build-up is undesirable from the point of view of achieving efficient heat transfer for cooling and heating the reactor contents, effective usage of monomer, effective control and monitoring of the polymerisation reaction, and acceptable polymer quality (in view of contamination by dislodged particles of the build-up).

Because of the problem in respect of heat transfer, polymerisation control and polymer quality, it is necessary to clean the reactor between each polymerisation cycle wherein the deposited material is removed as completely as possible, e.g. by scraping or chipping by hand, solvent cleaning or pressure-washing. This is wasteful in terms of the expense of the equipment and manpower required to carry out such cleaning and also in terms of the loss of productivity for a given reactor arising from the time taken to effect the cleaning operation. Hand cleaning is additionally undesirable in that it may constitute a health hazard to the cleaner in view of the harmful properties of certain monomers, particularly vinyl chloride. Indeed, opening up the reactor between polymerisation cycles for cleaning is itself undesirable in this respect since it releases residual monomer in the reactor to surrounding atmosphere.

It has been proposed in the published literature to coat the internal surfaces of a reactor used for vinyl halide, particularly vinyl chloride, polymerisation with numerous substances, both inorganic and organic, in order to prevent or reduce the formation of build-up therein.

In our experience we have found that while some substances certainly inhibit the formation of build-up, they tend to form coatings whose adherence to the reactor surface becomes weakened during the course of the polymerisation reaction; such coatings are therefore liable to become partly or wholly detached from the reactor surface during subsequent polymerisations in the reactor leading to the formation of build-up. Consequently it is necessary to recoat the reactor internal surfaces between each polymerisation cycle if the anti-build-up action of the coating substance is to be effective in the following polymerisations in the reactor. This adds to the cost of the polymerisation process.

Other substances which have been disclosed in the literature for preventing build-up, in particular conventional epoxy resins, have been found to form coatings whose adherence to the reactor surface remains very strong during the polymerisation reaction. However, in our experience, such substances have a poor anti-build-up action.

We have now discovered a product which forms a coating which not only exhibits a very effective anti-build-up action but also adheres very tenaciously to the reactor surface during polymerisation.

According to the present invention there is provided an epoxy resin made by cross-linking (I) the uncross-linked polyether intermediate of an epoxy resin, by admixture with (II) a product made from the reaction of
- (A) at least one aliphatic amine containing two or more primary aliphatic amino groups,
- (B) at least one aromatic amine containing two or more primary aromatic amino groups, and
- (C) at least one compound selected from oxo-group substituted aromatic compounds and quinone-type compounds.

wherein the molar ratio (A):(B) is from 4:1 to 1:3.

The use of the epoxy resin of the invention as a reactor coating enables vinyl halide monomers such as vinyl chloride to be polymerised in aqueous dispersion without any, or with a much reduced, formation of build-up. Moreover, due to the excellent adhesion of the coating made from the product of the invention, many polymerisations may be carried out in the same reactor without the need to recoat the internal surfaces between each polymerisation cycle.

Accordingly there is further provided according to the invention the use of an epoxy resin as defined above as a build-up suppressant coating for at least one internal surface of a polymerisation reactor.

There is further provided according to the invention a process for the polymerisation of vinyl halide monomers in aqueous dispersion wherein polymerisation is carried out in a reactor having adherently deposited on at least one internal surface thereof a build-up suppressant coating of an epoxy resin resin as defined above.

The uncross-linked polyether intermediate of an epoxy resin is made by mixed addition-condensation of a dihydroxy compound and an epoxide. The polyester intermediates of commercially available epoxy resins are generally derived from 2,2-bis(4-hydroxyphenyl) propane (bisphenol A) and epichlorohydrin, the reaction to form the polyether being given by

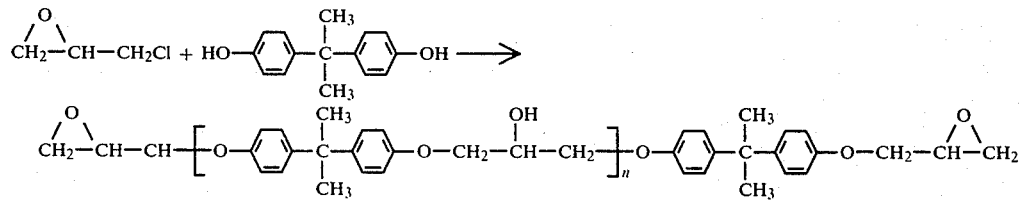

To form the epoxy resin, the polyether is cross-linked (cured) by using a multi-functional agent which opens up the terminal epoxide rings and bridges adjacent polyether molecules. Di- or polyamines are the usually preferred cross-linking agents.

The product (II) formed by the reaction of (A), (B) and (C) has been found by us to be a first rate build-up suppressant in its own right when coated onto a reactor surface. The present invention utilises the presence of the amino groups existing in this product from (A), (B) and (C) in order to effect the cross-linking of the polyether intermediate. Thus, in effect, the product of the invention is an epoxy resin formed from a conventional polyether intermediate and a cross-linking agent comprising the product from (A), (B) and (C) ( i.e. product II). Hence a coating of the epoxy resin of the invention possesses the excellent build-up suppressant behaviour on account of the product (II) and excellent adhesive properties because the product (II) is used in the form of a chemically bonded constituent of an epoxy resin. The product of the invention is also on excellent epoxy resin adhesive in its own right.

The molar ratio (A):(B) used in the production of product (II) is from 4:1 to 1:3, preferably 2:1 to 1:2. Decreasing the amount of component (B) tends to reduce the build-up suppressant behaviour of the final cross-linked epoxy resin while decreasing the amount of component (A) tends to reduce the adhesive properties of the final epoxy resin.

The molar ratio [(A)+(B)]:(C) is preferably from 1:4 to 2:1, particularly from 1:2 to 1:1, and particularly preferably 1:2 to 3:4.

The weight ratio of (I) to (II) is preferably from 1:4 to 2:1, particularly 1:3 to 1:1.

Preferred examples for (A) include alkyl and cycloalkyl polyamines (containing at least two primary aliphatic amino groups) and compounds structurally derived therefrom e.g. triethylene tetramine and tetraethylene-pentamine. Tetraethylenepentamine is particularly preferred.

Preferred examples for (B) include phenylene and naphthylene polyamines (containing at least two primary aromatic amino groups) and compounds structurally derived therefrom. A particularly preferred example for (B) is p-phenylene diamine.

Typical compounds for (C) include hydroquinone, benzoquinones and substituted benzoquinones, pyrogallol, phenol, para and meta substituted phenols, cresols, p-tertiarybutyl catechol, picric acid and resorcinol. Particularly preferred for (C) is the combination of hydroquinone and pyrogallol.

Hence a particularly preferred combination for (A), (B) and (C) is
  (A) tetraethylenepentamine
  (B) p-phenylene diamine
  (C) hydroquinone+pyrogallol The product (II) is usually prepared by reacting the selected compounds used for (A), (B) and (C) in a solvent or diluent, or mixture of solvents, or a solvent-/diluent mixture. The choice of solvent(s) or diluent(s) is not narrowly critical. For example, the solvent may be an alcohol such as methanol or ethanol, a ketone such as acetone or an aromatic hydrocarbon such as toluene or benzene. A preferred diluent is water. The preparation is preferably effected in the presence of oxygen, conveniently supplied by exposure of the reaction medium to the surrounding air. The reaction is sometimes advantageously carried out in the presence of a small amount of an acid catalyst such as hydrochloric acid or aluminium trichloride.

The reaction to form product (II) may be effected at ambient temperature. Alternatively the reaction may be effected at an elevated temperature, typically at the boiling point of the solvent or solvent/diluent employed. The solvent or solvent/diluent is usually removed (e.g. by distillation) to leave the product. The product (II) is typically a darkly coloured viscous liquid or crystalline-looking solid.

The admixture of (I) and (II) to form the epoxy resin coating of the invention may be effected by applying solutions or dispersions of (I) and (II) in a liquid carrier medium separately or concurrently to the reactor surface. More preferably, however, solutions or dispersions of (I) and (II) are mixed together immediately before application to the surface and the combined solution or dispersion applied to the reactor surface. The liquid carrier medium must be allowed or caused, e.g. by heating and/or evacuating or blowing air through the reactor, to evaporate so as to leave an adherent coating. Preferably the reactor wall is heated (e.g. up to 40°-70° C.) which helps to remove the diluent more rapidly and also aids the cross-linking reaction between (I) and (II). The liquid carrier medium may be chosen from the solvents or diluents mentioned above. Typically however a 50/50 volume mixture of acetone/methanol is a good solvent system for both (I) and (II).

The solution or dispersion of the admixed components (I) and (II) may be applied to the surfaces by any convenient means, for example by spraying, painting, dipping or flooding. The thickness of the coating of the epoxy resin of the invention is not too critical. Preferably it should be deposited at a rate of at least 0.1 g/m$^2$. If the coating layer is too thin (e.g. less than 0.001 g/m$^2$) the coating may be susceptible to wear by the polymerisation medium; if too thick (e.g. greater than 3 g/m$^2$) it may be susceptible to attack and become detached. Typically the epoxy resin may be deposited at a rate of 0.1-3 g/m$^2$, especially 1-2 g/m$^2$.

The coating may be formed on any surface inside the reactor which is liable to suffer the formation of build-up thereon. For example, it may be applied to the interior surface of the main body of the reactor, and to the interior surface of the roof of the reactor which is often above the liquid level of the polymerisation medium and usually suffers tenacious build-up thereon. If a condenser is installed in a part of the reactor that is in contact with the gaseous phase during polymerisation or if it is installed outside the reactor and connected thereto by conduit piping, the condenser and conduit piping may be similarly coated.

For the best results in cases where it is desired to carry out very many successive polymerisations in the same reactor (e.g. up to five or more) without recoating the reactor between polymerisations, it is preferable to use a multiple coating (e.g. three coatings) before starting the sequence of polymerisations.

The coating may be formed on a surface in combination with one or more other materials, e.g. materials which also have a suppressing effect on polymerisation build-up.

A reactor having internal surfaces coated with the epoxy resin of the invention may be used for the polymerisation of vinyl halide monomers particularly vinyl chloride, wherein the formation of build-up is eliminated or very much suppressed. The need to recoat between each polymerisation cycle is also eliminated. The polymerisation reaction may be carried out in the presence of a basic substance such as NaHCO₃ or a suitable buffering system to ensure an adequately high pH for the reaction medium (e.g. pH>4) as such as expedient can further enhance the build-up suppressant effect of the coating product.

By "vinyl halide monomers" is meant those monomers polymerisable by free-radical polymerisation which are olefinically unsaturated in the α-position and substituted by at least one halogen atom. These monomers are preferably selected from substituted derivatives of ethylene and contain only two carbon atoms. Examples of such monomers include vinyl chloride, vinyl bromide, vinyl fluoride, vinylidene chloride, vinylidene fluoride, chlorotrifluoroethylene and tetrafluoroethylene. The invention is preferably applied to the polymerisation of fluorine- or chlorine-containing vinyl monomers, especially vinyl chloride.

By "polymerisation" is meant both the homopolymerisation of the vinyl halide monomers and the copolymerisation with each other or with other comonomers copolymerisable therewith. Examples of the latter include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, α-olefines such as ethylene and propylene, vinyl ethers and styrene compounds.

We prefer to apply the invention to the production of polymers containing at least 50% molar and more particularly at least 80% molar, of units derived from vinyl halide monomers, particularly vinyl chloride.

The present invention may be particularly employed in any polymerisation technique where a monomer(s) is dispersed in the form of droplets in a liquid aqueous phase. For example it may be used for polymerisation in auqueous emulsion in which case any suitable emulsifying agent and water-soluble free-radical yielding initiator can be used. The invention is also very applicable to polymerisation in aqueous suspension and microsuspension, using any suitable dispersing agent and monomer-soluble free-radical yielding initiator.

In addition to emulsifying or dispersing agents and initiators, the aqueous dispersions (i.e. suspensions, microsuspensions and emulsions) may contain one or more additives that are sometimes employed in conventional processes for polymerisation in aqueous dispersion. Examples of such additives include particle size regulators, molecular weight regulators, stabilisers, plasticisers, colouring agents, reinforcing agents and processing aids.

The operating conditions for polymerisation according to the present invention may be those customarily used. For example, in the case of vinyl chloride polymerisation, the polymerisation temperature is generally between 40 and 75° C. and the pressure generally below 15 kg/cm².

The present invention is now illustrated by the following Examples. Unless otherwise specified all parts and percentages are by weight.

A number of products, denoted below as M1 to 5, were employed in the Examples and were made according to the following recipes. M1 corresponds to a product within the scope of product (II) (as defined above) while M2 to 5 correspond to products outside the scope of product (II).

M1

Tetraethylenepentamine (64 g) and p-phenylene diamine (48 g) dissolved in water (560 ml).
Hydroquinone (80 g) and pyrogallol (48 g) dissolved in ethanol (290 ml)/water (220 ml).
Conc. HCl (12 ml).
Product is a dark red/brown viscous syrup.

M2

Tetraethylenepentamine (109.4 g) dissolved in water (547 ml).
Hydroquinone (140.6 g) dissolved in ethanol (318 g)/water (242 ml).
Conc. HCl (17 ml).
Product is a dark red/brown viscous syrup.

M3

Tetraethylenepentamine (106.7 g) dissolved in water (534 ml).
Hydroquinone (106.7 g) and pyrogallol (36.6 g) dissolved in ethanol (325)/water (246 ml).
Conc. HCl (12.7 ml).
Product is a dark red/brown viscous syrup.

M4 p-phenylene diamine (160.0 g) dissolved in water (800 ml).
Hydroquinone (106.7 g) and pyrogallol (36.6 g) dissolved in ethanol (325 ml)/water (246 ml).
Conc. HCl (15.4 ml).
Product is a dark brown/purple granular solid of crystalline appearance.

M5

Tetraethylenepentamine (20 g) and p-phenylene diamine (60 g) dissolved in water (400 ml).
Hydroquinone (55 g) and pyrogallol (20 g) dissolved in ethanol (160 ml)/water (125 ml).
Conc. HCl (8 ml).
Product is a dark brown/purple granular solid of crystalline appearance.

The procedure for making the products M1 to 5 was as follows. Separate solutions of the amino and phenolic components were prepared as indicated, the amino components when containing p-phenylene diamine being heated to effect dissolution. The phenolic solution in each case was charged to a stirred reaction vessel (heating to 65° C. in the case of M4 and 5), followed by the amino solution, followed by the conc. HCl. The water and ethanol were then distilled off until the reaction temperature reached 107° C., or in the case of M4 and 5, until a crystalline-looking solid was obtained.

The products M1 to 5 were used in the following Examples as indicated.

EXAMPLES 1 TO 9

In Example 1, a series of three consecutive conventional vinyl chloride aqueous suspension polymerisations were carried out in a reactor of capacity about 5 liters, the initiator being bis(4-tertiarybutyl cyclohexyl)-peroxydicarbonate, the suspension agent being partially hydrolysed polyvinyl acetate and the polymerisation temperature being 57° C. Before the first polymerisation, 10% w/v solutions (in acetone/methanol-equal volumes) of the product M1 and the uncross-linked polyether intermediate made from epichlorohydrin and bisphenol A (commercially available as the separate resin component 'Araldite' 100 HV of the pack 'Araldite' 100 AV/HV) were mixed, the weight ratio between the polyether and M1 being 1:1.3, and immediately sprayed (thrice) onto all the clean internal surfaces of the reactor. After application, the reactor wall was heated to 50° C. for 10 minutes to dry the coating and to assist cross-linking to form an epoxy resin. The reactor was washed well with water before the second and third polymerisations but the applied coating was not removed or renewed. At the end of the three polymerisations the coating adhesion and build-up suppression performance were assessed; the results are shown in the Table.

Example 2 was a repetition of Example 1 with the ratio of polyether:M1 being 1:2; the results are shown in the Table.

Examples 3 to 9 employed the procedure of Examples 1 and 2 but used the products M2 to 5 in place of M1; the weight ratios polymer:M employed are given in the Table as are the results.

reactor. Severe build-up formed after only one polymerisation.

EXAMPLE 11

The procedure of Example 2 (i.e. using product M1; ratios as in the Table) was adopted except that the process was carried out in a reactor of capacity about 160 liters. Inspection after three polymerisations showed that the coating was still intact and that no build-up had formed.

We claim:

1. An epoxy resin made by cross-linking (I) the uncross-linked polyether intermediate of an epoxy resin, by admixture with (II) a product made from the reaction of

TABLE

| Ex. No. | Product M | Constituents of Product M (molar ratio) TEPA$^a$:PDA$^b$:HQ$^c$:PG$^d$ | Ratio (molar) TEPA:PDA | Ratio (molar) [TEPA + PDA]: [HQ + PG] | Ratio (wt) polyether:M | Coating Adhesion of Epoxy Resin | Build-up Suppression Performance of Epoxy Resin |
|---|---|---|---|---|---|---|---|
| 1 | M1 | 0.46:0.61:1.0:0.52 | 1:1.3 | 1:1.4 | 1:1.3 | Very good | Good |
| 2 | M1 | 0.46:0.61:1.0:0.52 | 1:1.3 | 1:1.4 | 1:2 | Very good | Good |
| 3 | M2 | 0.46: — :1.0: — | — | 1:2.2 | 1:2 | Excellent | Very poor |
| 4 | M2 | 0.46: — :1.0: — | — | 1:2.2 | 1:1 | Excellent | Very poor |
| 5 | M3 | 0.58: — :1.0:0.3 | — | 1:2.2 | 1:2 | Excellent | Poor |
| 6 | M3 | 0.58: — :1.0:0.3 | — | 1:2.2 | 1:1.3 | Excellent | Poor |
| 7 | M3 | 0.58: — :1.0:0.3 | — | 1:2.2 | 1:1 | Excellent | Poor |
| 8 | M4 | — :1.53:1.0:0.32 | — | 1.2:1 | 1:1 | Poor | Excellent where coating remains |
| 9 | M5 | 0.32:1.1:1.0:0.32 | 1:3.4 | 1.1:1 | 1:2 | Poor | Excellent where coating remains |

$^a$Tetraethylenepentamine
$^b$p-phenylene diamine
$^c$Hydroquinone
$^d$Pyrogallol In Examples 1 and 2, the product M1 falls within the scope of product (II) defined hereinbefore and the epoxy resin made from the polyether (product I) and M1 are within the scope of the invention. Consequently Examples 1 and 2 are according to the invention, and it can be seen that both coating adhesion and build-up suppression were good. In Examples 3 to 9, the products M2 to 5 are outside the scope of product (II) so that Examples 3 to 9 are not according to the invention. Examples 3 to 7 show that the aromatic amino constituent is essential if adequate build-up suppression is to be achieved, even if a high suppressant concentration is employed. Examples 8 and 9 show that decreasing the level of tetraethylenepentamine deleteriously affects coating adhesion.

EXAMPLE 10

The conventional polymerisation process of Examples 1 to 9 was carried out in the same reactor without any coating being applied to the internal surfaces of the (A) at least one aliphatic amine containing two or more primary aliphatic amino groups,
(B) at least one aromatic amine containing two or more primary aromatic amino groups, and
(C) at least one polyhydric phenol,
wherein the molar ratio (A):(B) is from 4:1 to 1:3.

2. An epoxy resin according to claim 1 wherein the uncross-linked polyether I is made from the reaction between 2,2-bis(4-hydroxyphenyl) propane and epichlorohydrin.

3. An epoxy resin according to claim 1 wherein the product (II) is made from the reaction of
(A) tetraethylenepentamine,
(B) p-phenylene diamine, and
(C) hydroquinone and optionally pyrogallol.

4. An epoxy resin according to claim 1 wherein the molar ratio (A):(B) is from 2:1 to 1:2.

5. An epoxy resin according to claim 1 wherein the molar ratio [(A)+(B)]:(C) is from 1:4 to 2:1.

6. An epoxy resin according to claim 1 wherein the weight ratio (I):(II) is from 1:4 to 2:1.

* * * * *